United States Patent [19]
Meyer

[11] Patent Number: 5,653,120
[45] Date of Patent: Aug. 5, 1997

[54] HEAT PUMP WITH LIQUID REFRIGERANT RESERVOIR

[75] Inventor: Kenneth James Meyer, Oswego, N.Y.

[73] Assignee: Carrier Corporation, Syracuse, N.Y.

[21] Appl. No.: 582,455

[22] Filed: Jan. 3, 1996

[51] Int. Cl.$^6$ .................................................. F25B 13/00
[52] U.S. Cl. ........................................ 62/324.4; 62/324.6
[58] Field of Search .............................. 62/149, 160, 174, 62/324.1, 324.4, 324.6

[56] References Cited

U.S. PATENT DOCUMENTS 2,976,698  3/1961  Muffly .............................. 62/324.6
3,200,605  8/1965  Brody .............................. 62/149

Primary Examiner—John M. Sollecito

[57] ABSTRACT

A refrigerant pump system wherein the outdoor coil is larger than the indoor coil to provide for efficient operation when the system is in a cooling mode. A refrigerant reservoir is mounted in a refrigerant line that connects the two coils during a heating mode which is arranged to collect liquid refrigerant, thus preventing the outdoor coil from becoming overcharged with refrigerant during the heating process. Efficient operation of the system is thus maintained during both heating and cooling without the need for expensive equipment to regulate the flow of refrigerant between the heat exchanger coils.

13 Claims, 2 Drawing Sheets

HEAT PUMP WITH LIQUID REFRIGERANT RESERVOIR

BACKGROUND OF THE INVENTION

This invention relates to an improved compression refrigerant heat pump and, in particular, to alleviating problems associated with overcharging the outdoor coil of the heat pump with refrigerant when the heat pump is operating in the heating mode.

A standard refrigerant air conditioning unit will contain an indoor coil for absorbing heat from a comfort zone into the refrigerant and an outdoor coil for rejecting the heat in the refrigerant to the surrounding ambient. In addition to handling the heat absorbed into the refrigerant during cooling, the outdoor coil must also handle the heat of compression developed by the unit compressor, and the heat generated by both the compressor motor and one or both of the coil fan motors. As a result, the outdoor coil of a standard air conditioning unit for providing cooling is considerably larger than the indoor coil simply because the outdoor coil must perform more work than the indoor coil.

As is well known, the standard air conditioning system can be employed to provide heat to a comfort zone by thermodynamically reversing the cooling cycle to draw heat from the surrounding ambient and rejecting the absorbed heat into the comfort zone. To this end, a reversing valve is connected to the unit compressor to reverse the flow of refrigerant through the coils. When in a heating mode, the larger outdoor coil acts as an evaporator and the indoor coil as a condenser in the system.

As can be seen, the functions of the outdoor and indoor coils are reversed when the system is in a heating mode. The condenser, which is now the indoor coil, is smaller than the evaporator or outdoor coil. Accordingly, the small condenser is not able to store as much liquid refrigerant as the outdoor coil, which acts as the condenser, than when the system is in the cooling mode. Because only a small amount of liquid refrigerant can be held back in the indoor coil, and thus an over-abundance of refrigerant is found in the outdoor coil producing an unwanted condition known as overcharging. This condition can be alleviated to some extent by use of regulated expansion devices such as thermal expansion valves for controlling the quality of return gas. These devices are relatively expensive and require the use of complex controls. Non regulated expansion devices such as capillary tubes and the like are less expensive and complex, however, they are incapable of regulating the return flow to the compressor when the heat pump is in a heating mode, and as a consequence, liquid or wet refrigerant may be delivered directly into the compressor pumping cavity thereby adversely effecting the operation of the system and compressor lifespan.

Industry standards require that refrigerant entering the compressor be superheated to about 10° above saturation in order to protect the compressor components. Most systems employ an accumulator tank in the suction line of the compressor to prevent liquid refrigerant from entering the compressor. Although use of an accumulator insures that only superheated vapors enter the compressor when the system is up and running, cold refrigerant nevertheless can be drawn into the compressor outlet during start up.

Along with the problem of low superheat, heat pumps employing rotary compressors encounter low oil temperatures whereupon the compressor discharge gas is able to condense into the oil. This, in turn, results in bearing problems and can lead to compressor failure.

Since the cooling mode determines the heat pump system design, the heating cycle will always be overcharged with refrigerant unless special precautions are taken. As noted, non-regulated expansion devices cannot close down the refrigerant flow between coils to eliminate overcharging. In an ideally adjusted heat pump system, therefore, more refrigerant is required in the cooling mode than in the heating mode. Attempts to equal the charges at some average value lowers the cooling performance to an unacceptable level and does not totally solve the problems associated with overcharging when operating in the cooling mode.

SUMMARY OF THE INVENTION

It is therefore an object of the present invention to improve refrigerant heat pumps.

It is a further object of the present invention to eliminate heat pump problems associated with overcharging the evaporator with refrigerant when the system is in the heating mode.

It is a still further object of the present invention to protect the compressor of a heat pump.

It is another object of the present invention to eliminate the need for regulated expansion devices or accumulators in a refrigerant heat pump system.

Another object of the present invention is to control the flow of refrigerant between the coils of a heat pump using inexpensive non-regulated expansion devices.

Still another object of the present invention is to improve the performance of a refrigerant heat pump in the heating mode without adversely effecting its performance in the cooling mode.

It is a still further object of the present invention to provide a refrigerant flow circuit for moving refrigerant between the coils of a heat pump which will automatically store overcharged refrigerant when the system is operating in a heating mode and releasing the overcharge when the system is operating in a cooling mode.

Another object of the present invention is to provide a heat pump system utilizing non-regulated expansion devices which delivers about the same amount of superheat at the inlet to the system compressor when operating in either the heating or the cooling mode.

These and other objects of the present invention are attained by a refrigerant heat pump utilizing the Carnot cycle wherein refrigerant is expanded from the high pressure side of the system to the low pressure side as it is moved between coils. A first refrigerant line is arranged to carry refrigerant from the indoor coil to the outdoor coil when the system is operating in a heating mode and a second refrigerant line is arranged to carry refrigerant from the outdoor coil to the indoor coil when the system is operating in a cooling mode. The first line contains a check valve to pass flow from the indoor coil to the outdoor coil and a non-regulated expansion device positioned between the check valve and the outdoor coil for throttling refrigerant from the high pressure side of the system to the low pressure side. A liquid reservoir is also positioned in this line between the indoor coil and the reversing valve. The second refrigerant line contains a second check valve arranged to pass flow from the outdoor coil to the indoor coil and a second non-regulated expansion device positioned in the line between the outdoor coil and the indoor coil. The second line is connected into the first line between the indoor coil and the refrigerant reservoir whereby refrigerant in the liquid phase is collected in the reservoir when the system is operating in the heating mode and vapor is collected in the reservoir when the system is operating in the cooling mode.

BRIEF DESCRIPTION OF THE DRAWINGS

For a better understanding of these and other objects of the present invention, reference shall be made herein to the following detailed description of the invention which is to be read in association with the accompanying drawings, wherein.

DESCRIPTION OF THE INVENTION

Figure 1:
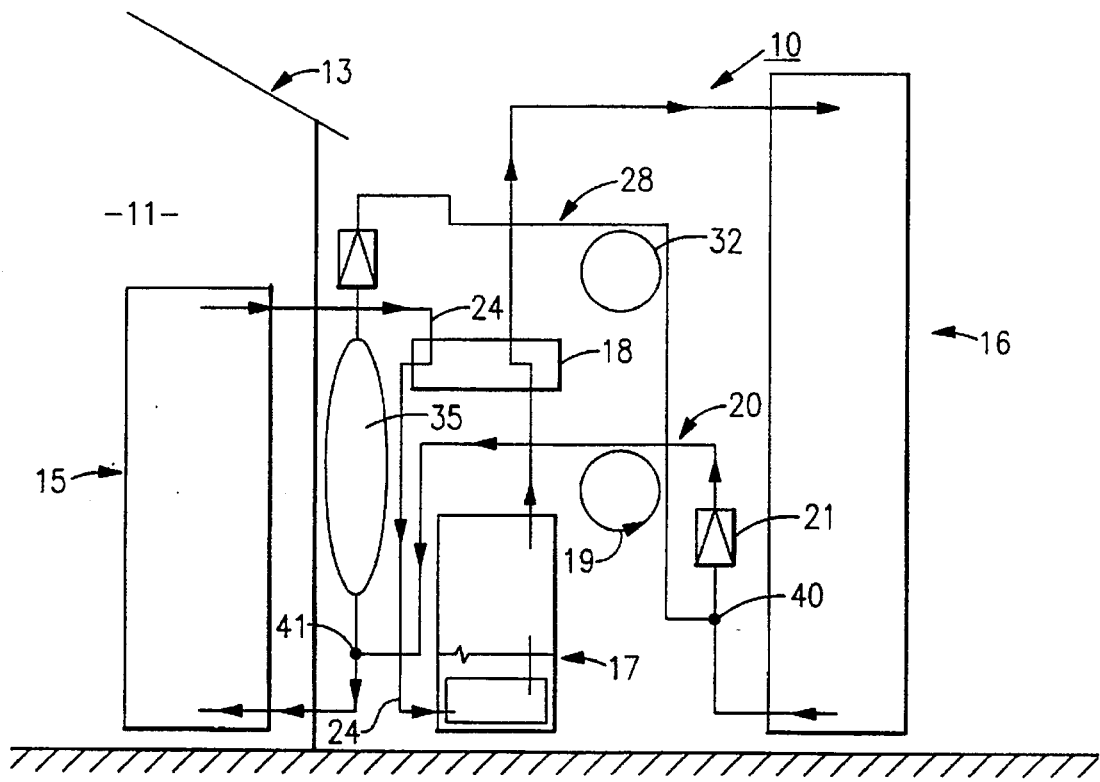
FIG. 1 is a schematic drawing illustrating a heat pump embodying the teachings of the present invention showing the heat pump operating in a cooling mode.

Referring to FIG. 1 there is illustrated schematically a refrigerant heat pump system 10 embodying the teachings of the present invention. The system employs the well known Carnot vapor compression cycle to provide either heating or cooling to a comfort region which, in this case, is an indoor zone 11 located on the inside of a building 13. The system includes an indoor heat exchanger 15 situated in the comfort zone and an outdoor heat exchanger 16 located on the outside of the building in heat transfer relation with the surrounding ambient. Also located on the outside of the structure is the system compressor 17 (mandated for noise reduction), which, in this case, is a rotary compressor as normally employed in this type of system.

The compressor is equipped with a reversing valve 18 that can be cycled when either a cooling or a heating mode of operation is selected. When, as in FIG. 1, the cooling mode is selected, the compressor discharge port is connected to the outdoor coil and the suction port is connected to the indoor coil. The outdoor coil thus serves as a condenser and the indoor coil as an evaporator in the system. As will be explained in greater detail below, refrigerant is expanded or throttled between the high pressure condenser and the low pressure evaporator by means of a non-regulated expansion device such as a capillary tube 19. Other examples of non-regulated expansion devices are throttling valves, and plate orifices which may also be used in the system without departing from the teachings of the present invention.

The capillary tube 19 is contained in a first refrigerant line 20 extending between the two coils. A check valve 21 is also operatively mounted in the refrigerant line and is arranged to permit refrigerant to flow in one direction only from the outdoor coil to the indoor coil. The check valve, as shown in FIG. 1, is positioned on the upstream side of the capillary tube.

As indicated by the arrows in FIG. 1, high pressure, high temperature refrigerant in vapor form is discharged form the compressor into the outdoor coil where the refrigerant is reduced to a liquid at a constant temperature. During this time, heat is given up to the surrounding ambient. The liquid refrigerant leaving the outdoor coil 16 is then expanded through a capillary tube 19 to a lower temperature and pressure as it moves through line 41 between the outdoor and indoor coils. Refrigerant enters the indoor coil as a wet mixture and is further evaporated to saturation as it absorbs energy (heat) from the comfort zone. The saturated vapor leaving the indoor coil is superheated in the suction line 24 under the influence of the compressor. By design, the coils are sized to handle the desired cooling load without overcharging the system when it is in the cooling mode. As a result, the system operates efficiently in the cooling mode without the need for an accumulator or a regulated expansion device.

Figure 2:
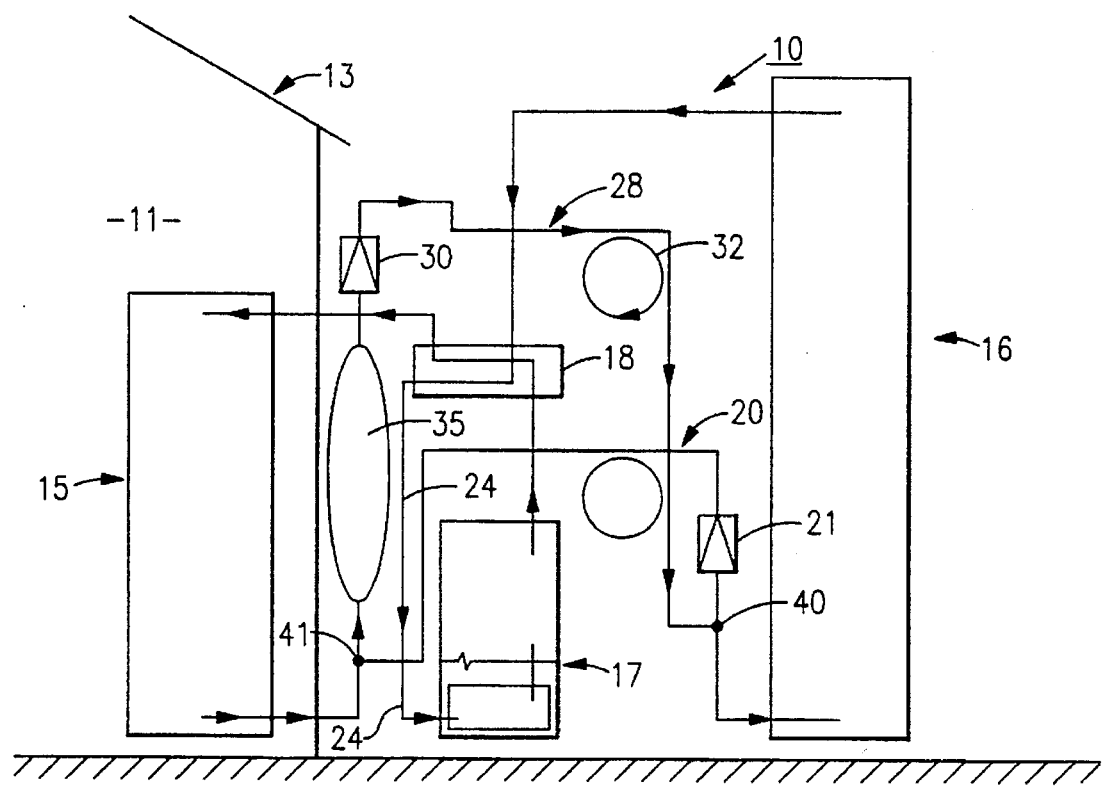
FIG. 2 is a schematic drawing illustrating the heat pump of FIG. 1 showing the heat pump operating in a heating mode.

A second refrigerant line 28 is also provided in the system which serves to deliver refrigerant from the indoor coil to the outdoor coil when the system is switched from the cooling mode described above into the heating mode as shown in FIG. 2. The refrigerant line 28 also contains a check valve 30 that permits refrigerant to flow in the line only in one direction from the indoor coil to the outdoor coil to throttle refrigerant as it moves between the coils. Here again, a capillary tube 32 is positioned in the line between the check valve and the outdoor coil. A refrigerant reservoir 35 is also mounted in the line 28 upstream from the check valve between the check valve 30 and the indoor coil 15. It should be noted that one end of the refrigerant line 28 enters the other refrigerant line 20 at connector 40 which is located between check valve 21 and the outdoor coil 16. The other end of line 28 is also attached to line 20 via a second connector 41 located between the refrigerant reservoir 35 and the indoor coil 15. As can be seen, the direction of flow through the conjoined refrigerant line is controlled by the two check valves.

Upon switching the system to a heating mode, the reversing valve is cycled to direct refrigerant gas at a high temperature and pressure from the compressor discharge port to the indoor coil. The gas is reduced to a liquid phase in the indoor coil which is now acting as a condenser and the heat of condensation is rejected into the comfort zone. Liquid refrigerant leaves the indoor coil and due to the arrangement of the two check valves, is conducted through refrigerant line 28 to the outdoor coil. As a result, the refrigerant reservoir 35 is filled to capacity with liquid high pressure refrigerant. The liquid refrigerant is expanded to the low pressure side of the system as it passes through capillary tube 32 prior to entering the outdoor coil. The outdoor coil now acts as an evaporator to absorb energy from the surrounding ambient thus evaporating the refrigerant to a saturated vapor. Again, under the influence of the compressor, the saturated vapor leaving the evaporator is superheated as it moves through the suction line 24 of the compressor.

As can be seen, because of the configuration of the two return lines and the positioning of the check valves, the refrigerant reservoir 35 acts as a receiver for liquid refrigerant only when the system is operating in a heating mode. The reservoir will receive only refrigerant vapor when the system is operating in a cooling mode. Because liquid refrigerant is far denser than the vapor, the reservoir holds considerably more refrigerant during heating than cooling. The reservoir is sized so that the system will not be overcharged with refrigerant during the heating cycle yet will be operating at peak efficiency during the cooling cycle. For example, a 9,000 btu unit will require about thirty ounces of liquid refrigerant for efficient operation during the cooling mode. However, only twenty-six ounces of liquid refrigerant is required for efficient operation during the heating mode. Under these conditions, the refrigerant reservoir is sized to store about four ounces of liquid refrigerant when the system is in the heating mode, thereby preventing overcharging of the outdoor coil during cooling operations. When the system is switched to a cooling mode, the reservoir will fill with only a negligible amount of refrigerant gas thus freeing up additional refrigerant for use in the cooling mode.

Figure 3:
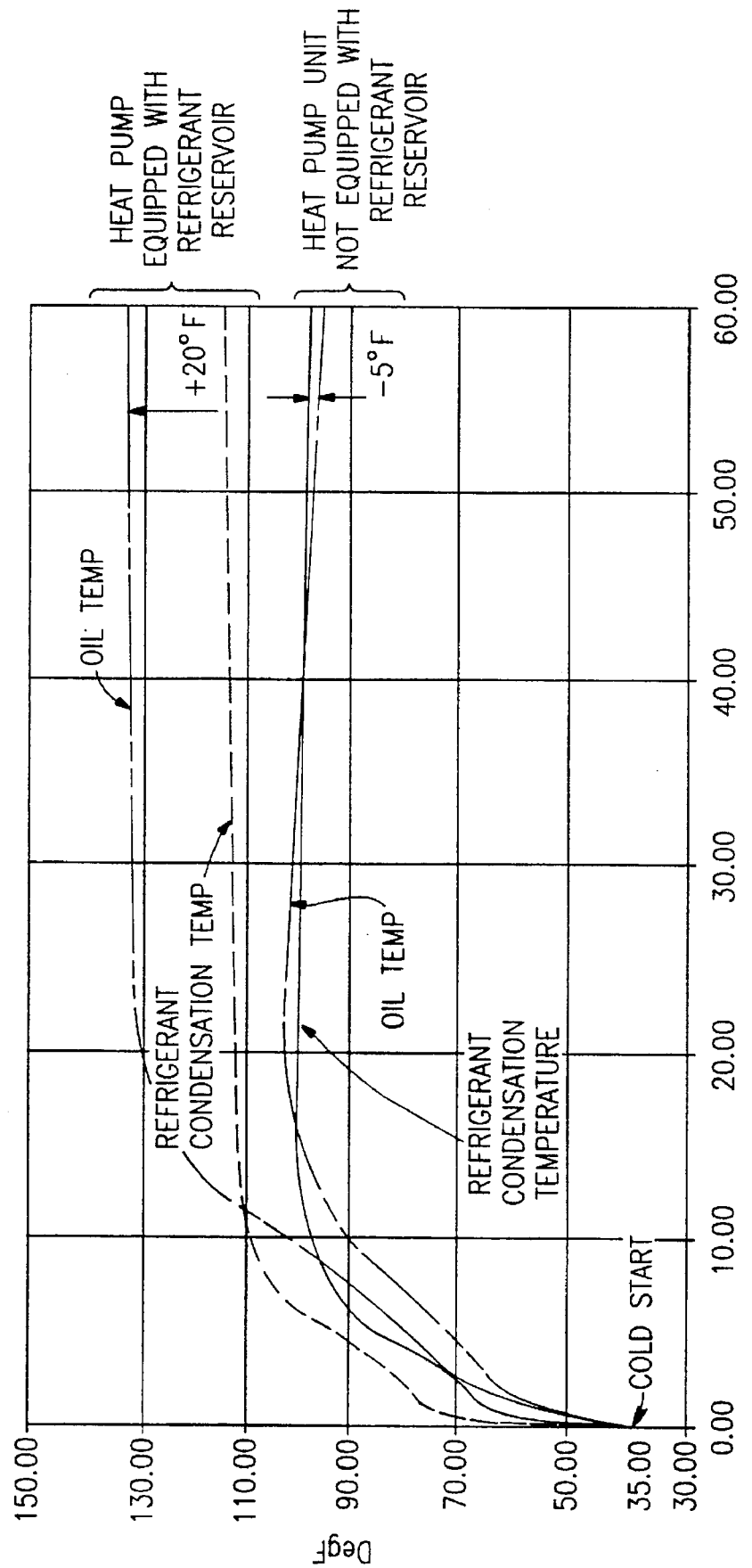
FIG. 3 is a diagram comparing oil to discharge condensation temperatures in a rotary compressor utilized in the present system over a one hour period of time.

The diagram of FIG. 3 compares the operation of the present system in a heating mode with a similar system that is not equipped with a liquid reservoir. The diagram plots the condensation temperature of refrigerant in the compression chamber of a rotary compressor with the compressor oil temperature. As illustrated, the oil temperature in the compressor of a system equipped with the present refrigerant reservoir will remain about 20° above the condensation temperature of the refrigerant in the compressor, thus assuring that the discharge gas in the compressor will not condense in the compressor when the system is called upon to produce heating.

In comparison, a heat pump of similar construction that is not equipped with the refrigerant reservoir of the present invention will become overcharged with refrigerant when running in the heating mode. As a consequence, the outdoor coil becomes flooded and the returning vapor to the compressor will not be superheated. This, in turn, causes the oil temperature in the compressor to drop below the condensation temperature of the refrigerant whereupon the oil in the compressor becomes diluted leading to bearing problems, ineffective heating, and early compressor failures.

While this invention has been explained with reference to the structure disclosed herein, it is not confined to the details set forth and this invention is intended to cover any modifications and changes as may come within the scope of the following claims:

What is claimed is:

1. A heat pump that includes
    an indoor coil for providing heating and cooling to an indoor comfort zone and an outdoor coil that is larger than the indoor coil for rejecting excess heat to the surrounding ambient when the heat pump is operating in a cooling mode,
    a first refrigerant line for connecting the indoor coil to the outdoor coil, a first valve means in said line for passing refrigerant in one direction from the indoor coil to the outdoor coil, a first non-regulated expansion device positioned in said line between the first valve means and the outdoor coil, and a refrigerant reservoir in said line positioned between the valve means and the indoor coil, and
    a second refrigerant line for connecting the outdoor coil to the indoor coil that includes a second valve means for passing refrigerant in one direction from the outdoor coil to the indoor coil and a second non-regulated expansion device positioned in said second line between the second valve means and the indoor coil.

2. The heat pump of claim 1 wherein said valve means are check valves.

3. The heat pump of claim 1 that further includes a first connector means for coupling the second refrigerant line to the first refrigerant line between the indoor coil and the refrigerant reservoir.

4. The heat pump of claim 3 that further includes a second connector means for coupling the first refrigerant line to the second refrigerant line between the outdoor coil and the second valve means.

5. The heat pump of claim 1 wherein said refrigerant reservoir is sized to hold sufficient liquid refrigerant to prevent the outdoor coil from being overcharged with refrigerant when the heat pump is operating in a heating mode.

6. The heat pump of claim 1 wherein said non-regulated expansion devices are capillary tubes.

7. A refrigerant heat pump that includes:
    an indoor coil for absorbing energy from a comfort zone when the heat pump is in a cooling mode and rejecting heat into the comfort zone when the heat pump is in a heating mode,
    an outdoor coil for rejecting energy to the surrounding ambient when the heat pump is in a cooling mode and absorbing energy when the heat pump is in a heating mode, said outdoor coil being larger than said indoor coil to reject excess energy when the heat pump is in the cooling mode,
    a compressor having a discharge port and a suction port,
    a reversing valve for selectively connecting the discharge port of the compressor to the indoor coil and the suction port of the compressor to the outdoor coil when the heat pump is in the heating mode, and the discharge port to the outdoor coil and the suction port to the indoor coil when the system is in the cooling mode,
    a first refrigerant line for connecting the indoor coil to the outdoor coil, a first valve means in the line for passing refrigerant in one direction from the indoor coil to the outdoor coil when the heat pump is operating in a heating mode, a first non-regulated expansion device positioned in the line between the first valve means and the outdoor coil, and a refrigerant reservoir in said line that is positioned between the first valve means and the indoor coil,
    a second refrigerant line for connecting the outdoor coil to the indoor coil, a second valve means in the second line for passing refrigerant in one direction from the outdoor coil to the indoor coil when the heat pump is operating in a cooling mode, and a second non-regulated expansion device positioned in said second line between the second valve means and the indoor coil,
    whereby a predetermined amount of liquid refrigerant is collected in said reservoir when the heat pump is operating in the heating mode.

8. The heat pump of claim 7 wherein said valve means are check valves.

9. The heat pump of claim 7 wherein said non-regulated expansion devices are capillary tubes.

10. The heat pump of claim 7 that further includes a first connector means for coupling the second refrigerant line to the first refrigerant line between the indoor coil and the refrigerant reservoir.

11. The heat pump of claim 10 that further includes a second connector means for coupling the first refrigerant line into the second refrigerant line between the outdoor coil and the second valve means.

12. The heat pump of claim 7 wherein said compressor is a rotary compressor and the refrigerant reservoir is sized so that the oil temperature in the compressor remains about 20° above the condensation temperature of the refrigerant in said compressor.

13. The heat pump of claim 7 wherein said refrigerant reservoir is sized to prevent overcharging the outdoor coil with refrigerant when the heat pump is operating in a heating mode.

* * * * *